US009823537B2

(12) United States Patent
Lo et al.

(10) Patent No.: US 9,823,537 B2
(45) Date of Patent: Nov. 21, 2017

(54) REFLECTIVE DISPLAY DEVICE

(71) Applicant: E Ink Holdings Inc., Hsinchu (TW)

(72) Inventors: Po-Yuan Lo, Hsinchu (TW); Tai-Yuan Lee, Hsinchu (TW); Hsiao-Tung Chu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/144,801

(22) Filed: May 2, 2016

(65) Prior Publication Data

US 2017/0031227 A1    Feb. 2, 2017

(30) Foreign Application Priority Data

Jul. 31, 2015   (TW) .............................. 104125001 A

(51) Int. Cl.
   *G02F 1/167*      (2006.01)
   *G02F 1/1335*     (2006.01)
   *G02F 1/00*       (2006.01)
   *G02F 1/19*       (2006.01)

(52) U.S. Cl.
   CPC ................ *G02F 1/167* (2013.01); *G02F 1/00* (2013.01); *G02F 1/133514* (2013.01); *G02F 1/19* (2013.01)

(58) Field of Classification Search
   CPC ... G02F 1/00; G02F 1/167; G02F 1/19; G02F 1/133514
   USPC ........................................................ 359/296
   See application file for complete search history.

(56) References Cited

U.S. PATENT DOCUMENTS

| 7,859,512 B2* | 12/2010 | Yuasa .................... G02F 1/1347 345/107 |
| 8,012,288 B2 | 9/2011 | Kim et al. |
| 8,277,697 B2 | 10/2012 | Royster, Jr. |
| 2007/0123133 A1 | 5/2007 | Winters |
| 2009/0047859 A1* | 2/2009 | Kim .................... G02F 1/133305 445/24 |
| 2009/0078938 A1* | 3/2009 | Yamazaki ............... G02F 1/167 257/59 |
| 2009/0237774 A1* | 9/2009 | Ito ........................... G02F 1/167 359/296 |
| 2010/0073279 A1* | 3/2010 | Kwon ..................... G02F 1/167 345/107 |
| 2010/0099324 A1 | 4/2010 | So |

(Continued)

FOREIGN PATENT DOCUMENTS

| TW | 201040587 A1 | 11/2010 |
| TW | 201314278 A1 | 4/2013 |

(Continued)

OTHER PUBLICATIONS

Corresponding Taiwanese Office Action.

*Primary Examiner* — William R Alexander
(74) *Attorney, Agent, or Firm* — CKC & Partners Co., Ltd.

(57) ABSTRACT

A reflective display device includes an electrophoretic display module, an adhesive layer, and a color filter layer. The adhesive layer is located on the electrophoretic display module. The color filter layer is located on the adhesive layer, and the adhesive layer is between the electrophoretic display module and the color filter layer. The color filter layer includes at least one color resist. The color resist has at least one opening, such that light can pass through the opening.

15 Claims, 6 Drawing Sheets

(56) References Cited

U.S. PATENT DOCUMENTS

| | | | |
|---|---|---|---|
| 2010/0157411 A1* | 6/2010 | Kwon | G02F 1/167 |
| | | | 359/296 |
| 2010/0194672 A1* | 8/2010 | Kim | G02B 5/201 |
| | | | 345/77 |
| 2011/0164307 A1* | 7/2011 | Paolini, Jr. | G02F 1/167 |
| | | | 359/296 |
| 2011/0170169 A1* | 7/2011 | Komatsu | G02F 1/167 |
| | | | 359/296 |
| 2012/0147468 A1 | 6/2012 | Bell et al. | |
| 2012/0187399 A1* | 7/2012 | Fukuda | H01L 29/78603 |
| | | | 257/43 |
| 2012/0236391 A1* | 9/2012 | Miyamoto | G02F 1/167 |
| | | | 359/296 |
| 2013/0083390 A1* | 4/2013 | Hwang | G02F 1/167 |
| | | | 359/296 |
| 2013/0128196 A1* | 5/2013 | Shinn | G02F 1/167 |
| | | | 349/106 |
| 2014/0192400 A1 | 7/2014 | Mochizuki et al. | |
| 2016/0187755 A1* | 6/2016 | Kasegawa | G02F 1/167 |
| | | | 359/296 |

FOREIGN PATENT DOCUMENTS

| | | |
|---|---|---|
| TW | 201339721 A | 10/2013 |
| TW | 201426150 A | 7/2014 |

* cited by examiner

REFLECTIVE DISPLAY DEVICE

RELATED APPLICATIONS

This application claims priority to Taiwanese Application Serial Number 104125001, filed Jul. 31, 2015, which is herein incorporated by reference.

BACKGROUND

Field of Invention

The present invention relates to a reflective display device.

Description of Related Art

In a market full of a wide variety of consumer electronic products, electrophoretic display devices have been extensively utilized as display screens in electronic products. A display medium layer of an electrophoretic display device is formed of the main elements of an electrophoresis buffer and white and black charged particles doped in the electrophoresis buffer. The white and black charged particles are driven to move by applying a voltage to the display medium layer, such that each pixel displays a black color, a white color or a gray level. The electrophoretic display device utilizes incident light that irradiates the display medium layer to form reflected light so as to achieve the purpose of display. The incident light may be sunlight or indoor ambient light. Therefore, the electrophoretic display device needs no backlight, which reduces power consumption.

Moreover, a color filter array (CFA) may be adhered to the display medium layer to enable the electrophoretic display device to have a color display function. When light enters or exits from the color filter array, the color resists of the color filter array can filter light with a specific wavelength. For example, after light passes through a red color resist, the color of the light is changed to red. However, when incident light enters the electrophoretic display device having the color display function, the incident light passes through the color resists of the color filter array. Thereafter, the incident light is reflected by the display medium layer to form reflected light, and the reflected light passes through the color resists of the color filter array and out from the display device. As a result, the light passes through the color filter array twice (i.e., via the entrance and exit of the light) such that light loss occurs two times. Hence, the brightness and reflectivity of the electrophoretic display device having the color display function is reduced. In particular, the reflectivity is about 12.

Generally, in order to decrease light loss in the electrophoretic display device having the color display function, a newly designed display medium layer may be used to improve brightness. However, the stability of such a newly designed display medium layer may be poor, and the cost of manufacture is increased. Alternatively, the saturation of the color resists of the color filter array may be reduced to improve the reflectivity of the electrophoretic display device, but this method reduces the color saturation of the electrophoretic display device.

SUMMARY

An aspect of the present invention is to provide a reflective display device.

According to an embodiment of the present invention, a reflective display device includes an electrophoretic display module, an adhesive layer, and a color filter layer. The adhesive layer is located on the electrophoretic display module. The color filter layer is located on the adhesive layer, and the adhesive layer is between the electrophoretic display module and the color filter layer. The color filter layer includes at least one color resist. The color resist has at least one opening for being passed through by light.

In one embodiment of the present invention, the opening of the color resist is square, circular, or polygonal.

In one embodiment of the present invention, the width of the opening of the color resist is in a range from 10 μm to 25 μm.

In one embodiment of the present invention, after incident light enters the opening of the color resist and is reflected by the electrophoretic display module, reflected light is formed and passes outwardly through the region of the cob resist surrounding the opening.

In one embodiment of the present invention, the opening is located at the central position of the region.

In one embodiment of the present invention, the width of the region is in a range from 70 μm to 85 μm.

In one embodiment of the present invention, the color resist is red green, blue, or yellow.

In one embodiment of the present invention the electrophoretic display module includes a display medium layer, a protection layer, and an array substrate. The protection layer is between the display medium layer and the adhesive layer. The display medium layer is between the array substrate and the protection layer.

In one embodiment of the present invention, the array substrate has at least one thin-film transistor, and the orthogonal projection of the color resist on the array substrate overlaps at least a portion of the thin-film transistor.

In one embodiment of the present invention, the protection layer is made of a material including polyethylene terephthalate, and the thickness of the protection layer is in a range from 20 μm to 30 μm.

In one embodiment of the present invention, the color filter layer further includes at least one blank region. The blank region is adjacent to the edge of the color resist.

In one embodiment of the present invention, the thickness of the adhesive layer is in a range from 60 μm to 80 μm.

In one embodiment of the present invention, the color filter layer includes a plurality of color resists, and each of a select number of the color resists has the opening.

In one embodiment of the present invention, the color resist has a plurality of openings, and a plurality of gaps between every two adjacent openings are not the same.

In one embodiment of the present invention, the color resist has a first opening, a second opening, a third opening, and a fourth opening. The first and second openings are arranged in a horizontal direction, and the second and third openings are arranged in a vertical direction that is perpendicular to the horizontal direction. The fourth opening is arranged on a line that is connected to the first and third openings. A first gap between the first and second openings is greater than each of a second gap between the first and fourth openings and a third gap between the third and fourth openings. A fourth gap between the second and third openings is greater than each of the second and third gaps.

In the aforementioned embodiments of the present invention, since the color resist of the color filter layer has the opening, incident light entering from the opening of the color resist does not undergo loss. After such incident light is reflected by the electrophoretic display module, reflected light may be formed to pass through the color resist so as to have a color. That is to say, as long as the incident light enters the reflective display device from the opening of the color resist, the reflected light of the incident light only suffers a loss that is caused by the reflected light once passing through the color resist. Moreover, after other incident light enters the reflective display device from the color resist that is adjacent to the opening, this incident light has a color and suffers a loss. After such incident light is reflected by the electrophoretic display module, reflected light may be formed to pass through the opening of the color resist. That is to say, as long as the reflected light exits from the reflective display device through the opening of the color resist, the reflected light also only suffers a loss that is caused by the incident light once passing through the color resist. Hence, the reflectivity and brightness of the reflective display device of the present invention may be improved.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
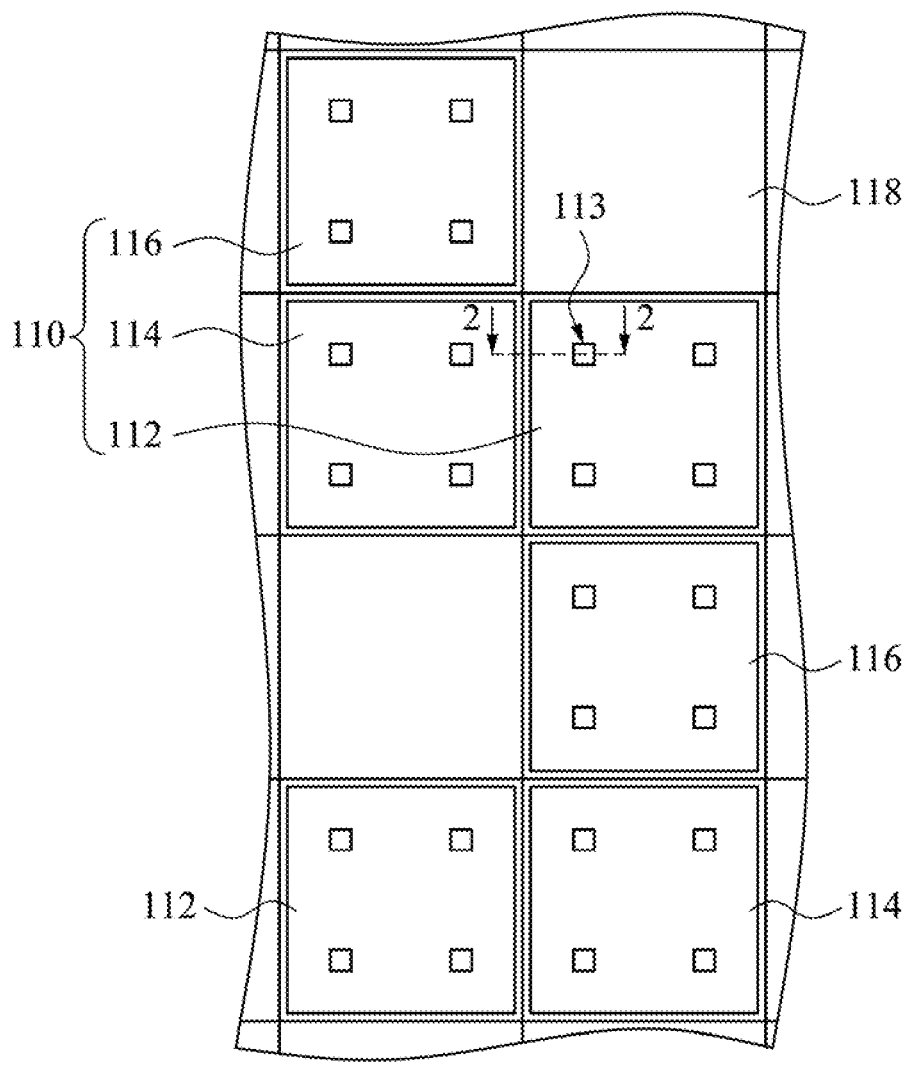
FIG. 1 is a top view of a color filter layer of a reflective display device according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
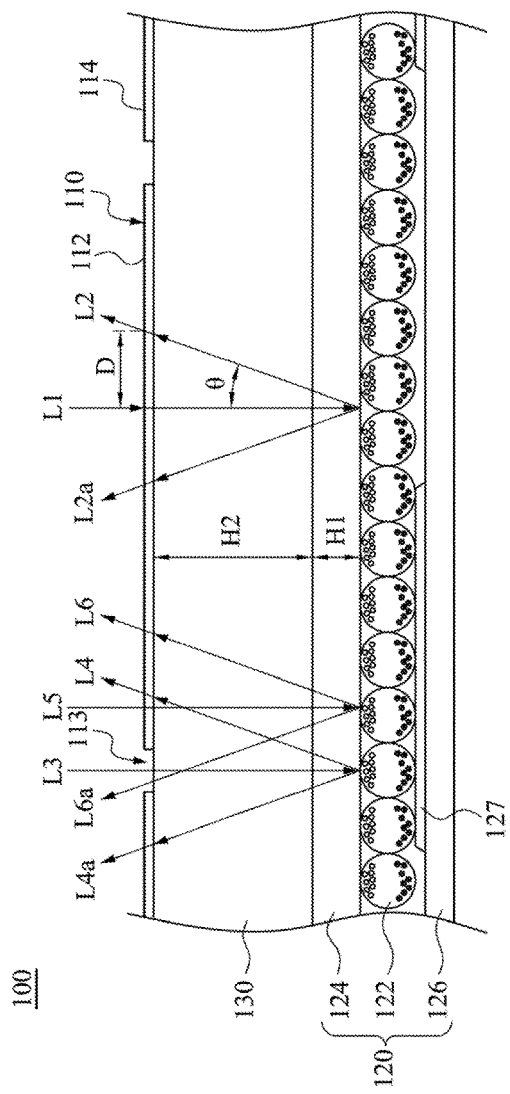
FIG. 2 is a cross-sectional view of the reflective display device taken along line 2-2 shown in FIG. 1.

FIG. 1 is a top view of a color filter layer 110 of a reflective display device 100 according to one embodiment of the present invention. FIG. 2 is a cross-sectional view of the reflective display device 100 taken along line 2-2 shown in FIG. 1. As shown in FIG. 1 and FIG. 2, the reflective display device 100 includes the color filter layer 110, an electrophoretic display module 120, and an adhesive layer 130. The adhesive layer 130 is located on the electrophoretic display module 120. The color filter layer 110 is located on the adhesive layer 130, and the adhesive layer 130 is between the electrophoretic display module 120 and the color filter layer 110. The color filter layer 110 includes plural color resists 112, 114, 116. In this embodiment, the color resist 112 is red, the color resist 114 is green, and the color resist 116 is blue, but the present invention is not limited in this regard. For example, the color filter layer 110 may include a yellow color resist. Moreover, each of the color resists 112, 114, 116 has at least one opening 113, and thus light may pass through the openings 113 of the color resists 112, 114, 116. In this embodiment, each of the color resists 112, 114, 116 has four openings 113, but the present invention is not limited to the number of the openings 113. In another embodiment, only some of a select number of the color resists have one or more of the openings 113, and other color resists have no opening 113. For example, as deemed necessary by designers, the color resist 114 at the lower right-hand corner of FIG. 1 may be designed as a typical green color resist that has no opening 113.

The electrophoretic display module 120 includes a display medium layer 122, a protection layer 124, and an array substrate 126. The protection layer 124 is between the display medium layer 122 and the adhesive layer 130, and the display medium layer 122 is between the array substrate 126 and the protection layer 124. The display medium layer 122 may be used to reflect light. In the following description, light entering and exiting from the color resist 112 is used as an example, but in practice light may also passing through the color resist 114 or the color resist 116.

After incident light L1 passes through the color resist 112 to enter the reflective display device 100, the incident light L1 is reflected by the display medium layer 122 to form reflected light L2, L2a. The reflected light L2, L2a then passes through the color resist 112 so as to irradiate out of the reflective display device 100. Each time light passes through the color resist 112, the light suffers a 70% loss. Since the reflected light L2, L2a irradiating out of the reflective display device 100 suffers a loss that is caused by the incident light L1 initially passing through the color resist 112 and the reflected light L2, L2a passing through the color resist 112 after being reflected by the display medium layer 112 (i.e., suffers a loss from twice passing through the color resist 112), the brightness of the reflected light L2, L2a is low. In a typical reflective display device, only such reflected light L2, L2a can be formed.

However, since the color resist 112 of the color filter layer 110 of the present invention has the opening 113, incident light L3 entering from the opening 113 of the color resist 112 does not undergo loss. After such incident light L3 is reflected by the display medium layer 122 of the electrophoretic display module 120, reflected light L4, L4a may be formed to pass through the color resist 112 so as to have a color (e.g., red). That is to say, as long as the incident light L3 enters the reflective display device 100 from the opening 113 of the color resist 112, the reflected light L4, L4a of the incident light L3 only suffers a loss that is caused by the reflected light L4, L4a once passing through the color resist.

Moreover, after other incident light L5 enters the reflective display device 100 through the color resist 112 at a location of the color resist 112 that is adjacent to the opening 113, the incident light L5 has a color (e.g. red) and the incident light L5 suffers a loss. After such incident light L5 is reflected by the display medium layer 122 of the electrophoretic display module 120, reflected light L6a may be formed to pass through the opening 113 of the color resist 112. That is to say, as long as the reflected light L6a exits from the reflective display device 100 through the opening 113 of the color resist 112, the reflected light L6a also only suffers a loss that is caused by the incident light L5 once passing through the color resist 112.

Hence, the brightness of the reflected light L4, L4a, L6 shown in FIG. 2 is greater than that of the reflected light L2, L2a, such that the overall reflectivity and brightness of the reflective display device 100 of the present invention may be improved. For example, the reflectivity may be improved to 13-15.

In this embodiment, an included angle θ is formed between each incident light and the corresponding reflected light. For example, the included angle θ may be about 15 degrees and formed between the incident light L1 and the reflected light L2, between the incident light L3 and the reflected light L4, and between the incident light L5 and the reflected light L6a. Furthermore, at the surface of the color filter layer 110, a distance D is formed between each incident light and the corresponding reflected light. For example, the distance D may be about 30 μm and formed between the incident light L1 and the reflected light L2, between the incident light L3 and the reflected light L4, and between the incident light L5 and the reflected light L6a.

In this embodiment, the color filter layer 110 further includes at least one blank region 118. The blank region 118 may be adjacent to the edges of the color resists 112, 116. After light enters the reflective display device 100 from the blank region 118, the light may be reflected by the display medium layer 122 of the electrophoretic display module 120, and reflected light may irradiate out of the reflective display device 100 from the blank region 118. Since the light enters and exits from the blank region 118 of the color filter layer 110 and does not pass through the color resists 112, 114, 116 that have colors, the blank region 118 may be used to display an image with a gray level a black color, or a white color.

Moreover, the array substrate 126 has at least one thin-film transistor 127, and the orthogonal projection of the color resist 112 on the array substrate 126 overlaps at least a portion of the thin-film transistor 127. As a result of such a design, the array substrate 126 may control the display medium layer 122 to reflect or not to reflect light that enters the color resist 112, thereby facilitating the variation of a display image.

In this embodiment, the protection layer 124 is made of a material including polyethylene terephthalate (PET), and the thickness H1 of the protection layer 124 is in a range from 20 μm to 30 μm. The thickness H2 of the adhesive layer 130 is in a range from 60 μm to 80 μm, and the adhesive layer 130 may be an optical clear resin (OCR).

Figure 3:
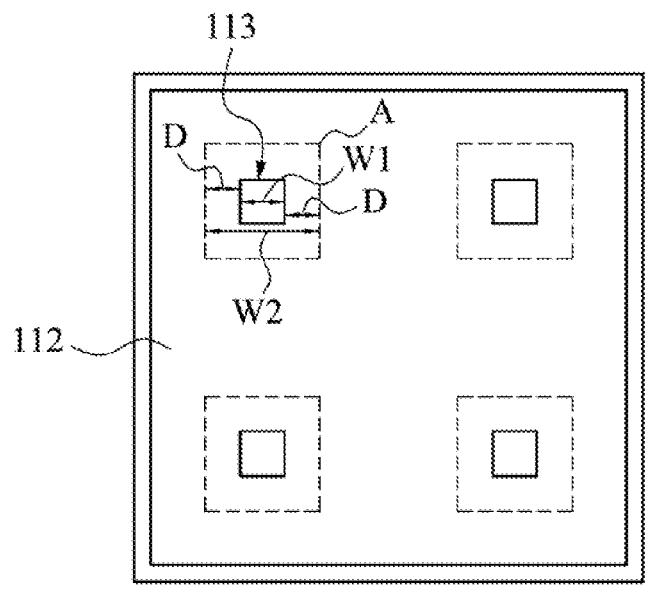
FIG. 3 is an enlarged view of a color resist shown in FIG. 1.

FIG. 3 is an enlarged view of the color resist 112 shown in FIG. 1. As shown in FIG. 2 and FIG. 3, the opening 113 of the color resist 112 is square, but in another embodiment, the opening 113 may be circular or polygonal. The width W1 of the opening 113 of the color resist 112 may be in a range from 10 μm to 25 μm. After the incident light L3 enters the opening 113 of the color resist 112 and is reflected by the display medium layer 122 of the electrophoretic display module 120, the reflected light L4, L4a is formed. The reflected light L4, L4a passes outwardly through the region A of the color resist 112 surrounding the opening 113. The opening 113 is located at the central position of the region A. At the surface of the color filter layer 110, since the distance D (e.g., 30 μm) is formed between the incident light L3 and the reflected light L4 (or the reflected light L4a) and the opening 113 has the width W1, the width W2 of the region A may be in a range from 70 μm to 85 μm.

In this embodiment, the reflected light in the region A (including the opening 113) only suffers a loss that is caused by once passing through the color resist 112, and the reflected light outside of the region A suffers a loss that is caused by twice passing through the color resist 112. Therefore, the brightness of the region A is greater than that of outside of the region A. Moreover, since the reflected light in the region A only passes through the color resist 112 once, the color in the region A is lighter than the color outside of the region A. The number and the positions of the openings 113 in the color resists 112, 114, 116 (see FIG. 1) may be determined as deemed necessary by designers, such that equilibrium between the brightness and the color saturation of the reflective display device 100 is achieved.

It is to be noted that the connection relationships and materials of the elements described above will not be repeated in the following description, and only aspects related to the color resists that have other arrangements of the openings will be described.

Figure 4:
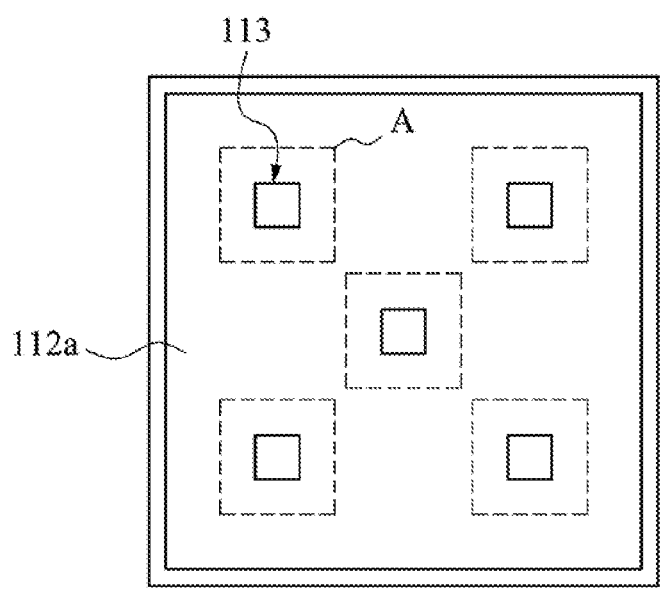
FIG. 4 is a top view of a color resist according to one embodiment of the present invention.

FIG. 4 is a top view of a color resist 112a according to one embodiment of the present invention. The difference between this embodiment and the embodiment shown in FIG. 3 is that the color resist 112a has five openings 113, and one of the openings 113 is at the central position of the color resist 112a. Since the number of the openings 113 of the color resist 112a is greater than that of the color resist 112 of FIG. 3, the brightness and reflectivity of the color resist 112a that are obtained by measurement are respectively greater than that of the color resist 112 of FIG. 3 that are obtained by measurement.

Figure 5:
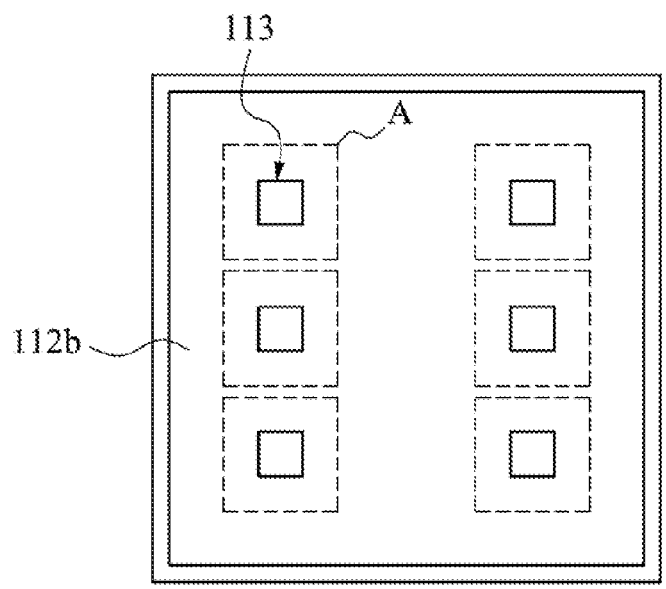
FIG. 5 is a top view of a color resist according to one embodiment of the present invention.

FIG. 5 is a top view of a color resist 112b according to one embodiment of the present invention. The difference between this embodiment and the embodiment shown in FIG. 4 is that the color resist 112b has six openings 113, in which three of the openings 113 are arranged in a column and the other three openings 113 are arranged in another column. Moreover, the two columns of the openings are parallel. Since the number of the openings 113 of the color resist 112b is greater than that of the color resist 112a of FIG. 4, the brightness and reflectivity of the color resist 112b that are obtained by measurement are respectively greater than that of the color resist 112a of FIG. 4 that are obtained by measurement.

Figure 6:
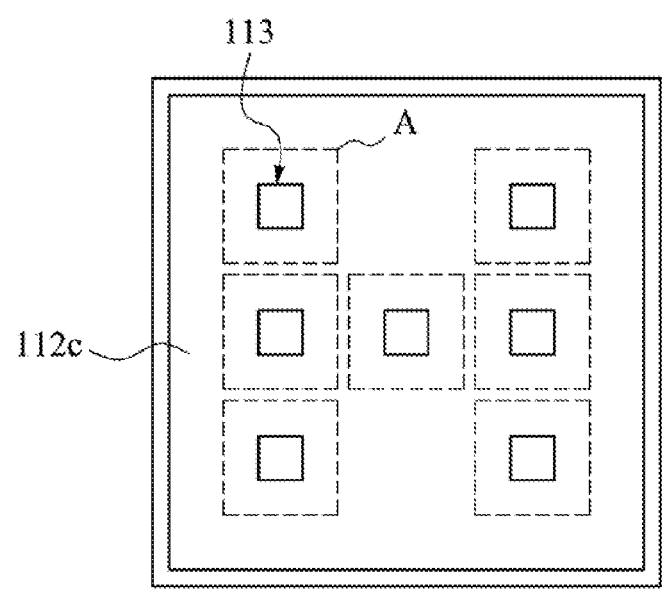
FIG. 6 is a top view of a color resist according to one embodiment of the present invention.

FIG. 6 is a top view of a color resist 112c according to one embodiment of the present invention. The difference between this embodiment and the embodiment shown in FIG. 5 is that the color resist 112c has seven openings 113, and one of the openings 113 is at the central position of the color resist 112c. Since the number of the openings 113 of the color resist 112c is greater than that of the color resist 112b of FIG. 5, the brightness and reflectivity of the color resist 112c that are obtained by measurement are respectively greater than that of the color resist 112b of FIG. 5 that are obtained by measurement.

Figure 7:
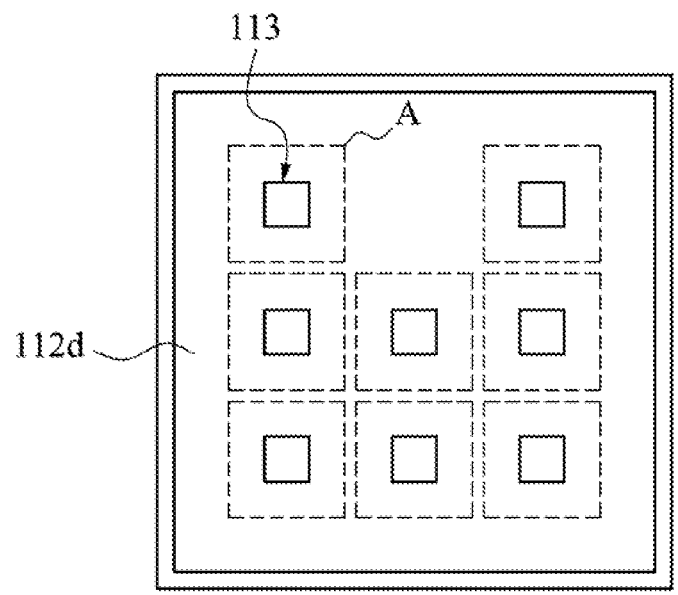
FIG. 7 is a top view of a color resist according to one embodiment of the present invention.

FIG. 7 is a top view of a color resist 112d according to one embodiment of the present invention. The difference between this embodiment and the embodiment shown in FIG. 6 is that the color resist 112d has eight openings 113, and one of the openings 113 is between two of the openings 113 that are at the lower position of the color resist 112d. Since the number of the openings 113 of the color resist 112d is greater than that of the color resist 112c of FIG. 6, the brightness and reflectivity of the color resist 112d that are obtained by measurement are respectively greater than that of the color resist 112c of FIG. 6 that are obtained by measurement.

Figure 8:
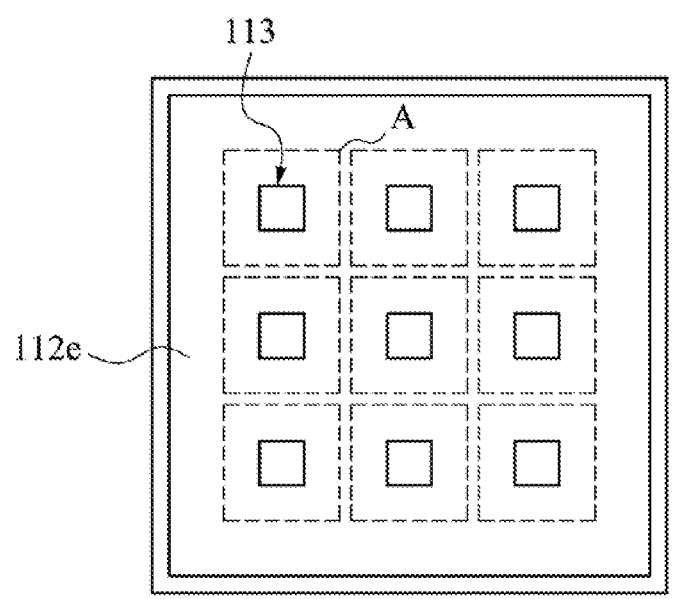
FIG. 8 is a top view of a color resist according to one embodiment of the present invention.

FIG. 8 is a top view of a color resist 112e according to one embodiment of the present invention. The difference between this embodiment and the embodiment shown in FIG. 7 is that the color resist 112e has nine openings 113, and one of the openings 113 is between two of the openings 113 that are at the upper position of the color resist 112e. The openings 113 of the color resist 112e are in a nine-cell matrix arrangement. Since the number of the openings 113 of the color resist 112e is greater than that of the color resist 112d of FIG. 7, the brightness and reflectivity of the color resist 112e that are obtained by measurement are respectively greater than that of the color resist 112d of FIG. 7 that are obtained by measurement.

Figure 9:
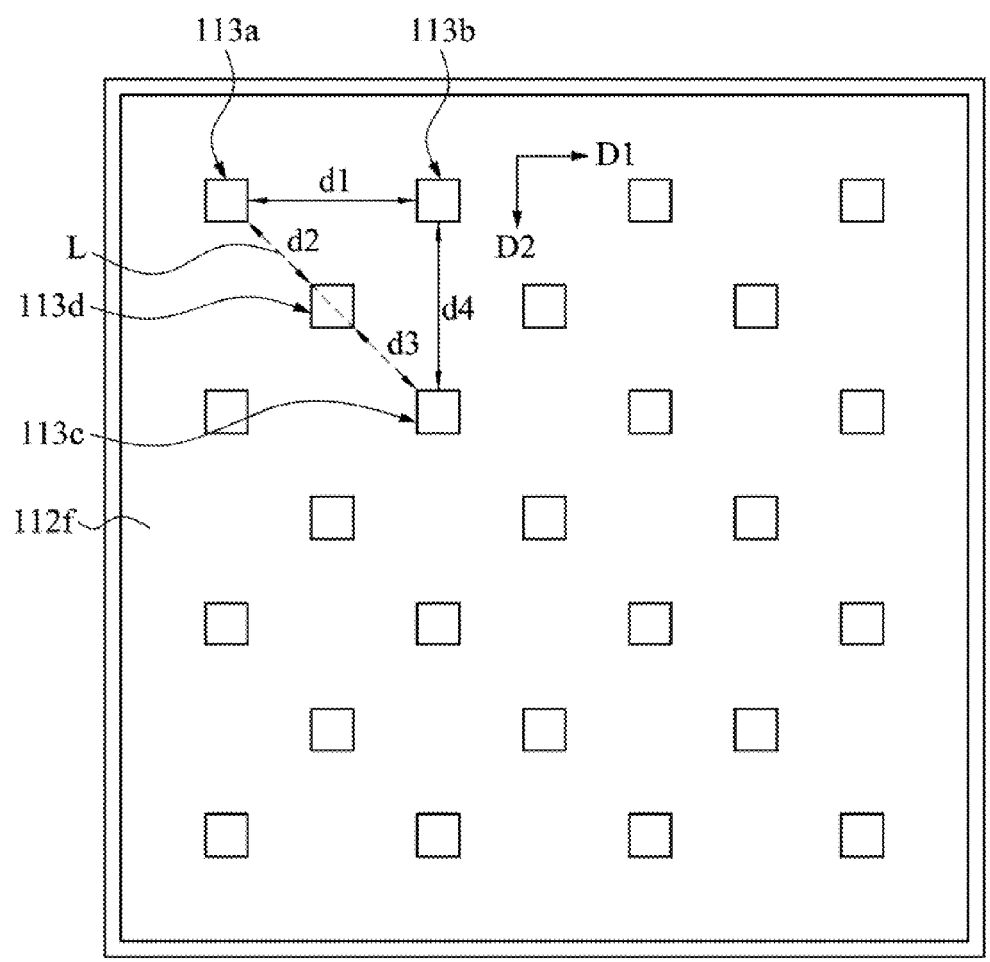
FIG. 9 is a top view of a color resist according to one embodiment of the present invention.

FIG. 9 is a top view of a color resist 112f according to one embodiment of the present invention. The color resist 112f has a plurality of openings and a plurality of gaps between every two adjacent openings, and the gaps are not the same. For example, the color resist 112f has a first opening 113a a second opening 113b, a third opening 113c, and a fourth opening 113d. The first and second openings 113a, 113b are arranged in a horizontal direction D1, and the second and third openings 113b, 113c are arranged in a vertical direction D2 that is perpendicular to the horizontal direction D1. The fourth opening 113d is arranged on a dotted line L that is connected to the first and third openings 113a, 113c. A first gap d1 between the first and second openings 113a, 113b is greater than each of a second gap d2 that is between the first and fourth openings 113a, 113d and a third gap d3 that is between the third and fourth openings 113c, 113d. Moreover, a fourth gap d4 between the second and third openings 113b, 113c is greater than each of the second and third gaps d2, d3.

In this embodiment, the number of the openings is 25, but the present invention is not limited in this regard. The first and second gaps d1 and d2 may be the same, such as about 48 µm. The fourth opening 113d may be on the center of the line L, such that the second and third gaps d2, d3 are the same. For example, each of the second and third gaps d2, d3 is about 19.8 µm. Since the number of the openings of the color resist 112f is greater than that of the color resist 112e of FIG. 8, the brightness and reflectivity of the color resist 112f that are obtained by measurement are respectively greater than that of the color resist 112e of FIG. 8 that are obtained by measurement.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A reflective display device, comprising:
   an electrophoretic display module;
   an adhesive layer located on the electrophoretic display module; and
   a color filter layer located on the adhesive layer, wherein the adhesive layer is between the electrophoretic display module and the color filter layer, and the color filter layer comprises:
   at least one color resist having at least one opening therein for being passed through by light, wherein the opening extends through two opposite surfaces of the color resist and is enclosed by the color resist.

2. The reflective display device of claim 1, wherein the opening of the color resist is square, circular, or polygonal.

3. The reflective display device of claim 1, wherein a width of the opening of the color resist is in a range from 10 µm to 25 µm.

4. The reflective display device of claim 1, wherein after incident light enters the opening of the color resist and is reflected by the electrophoretic display module, reflected light is formed and passes outwardly through a region of the color resist surrounding the opening.

5. The reflective display device of claim 4, wherein the opening is located at a central position of the region.

6. The reflective display device of claim 4, wherein a width of the region is in a range from 70 µm to 85 µm.

7. The reflective display device of claim 1, wherein the color resist is red, green, blue, or yellow.

8. The reflective display device of claim 1, wherein the electrophoretic display module comprises:
   a display medium layer;
   a protection layer between the display medium layer and the adhesive layer; and
   an array substrate, wherein the display medium layer is between the array substrate and the protection layer.

9. The reflective display device of claim 8, wherein the array substrate has at least one thin-film transistor, and an orthogonal projection of the color resist on the array substrate overlaps at least a portion of the thin-film transistor.

10. The reflective display device of claim 8, wherein the protection layer is made of a material comprising polyethylene terephthalate, and a thickness of the protection layer is in a range from 20 µm to 30 µm.

11. The reflective display device of claim 1, wherein the color filter layer further comprises:
    at least one blank region adjacent to an edge of the color resist.

12. The reflective display device of claim 1, wherein a thickness of the adhesive layer is in a range from 60 µm to 80 µm.

13. The reflective display device of claim 1, wherein the color filter layer comprises a plurality of color resists, and each of a select number of the color resists has the opening.

14. The reflective display device of claim 1, wherein the color resist has a plurality of openings, and a plurality of gaps between every two adjacent openings are not the same.

15. The reflective display device of claim 14, wherein the color resist has a first opening, a second opening, a third opening, and a fourth opening; the first and second openings are arranged in a horizontal direction, and the second and third openings are arranged in a vertical direction that is perpendicular to the horizontal direction; the fourth opening is arranged on a line that is connected to the first and third openings; a first gap between the first and second openings is greater than each of a second gap between the first and fourth openings and a third gap between the third and fourth openings; a fourth gap between the second and third openings is greater than each of the second and third gaps.

* * * * *